Jan. 20, 1925.
C. F. HESS
1,523,591
AUTOMOBILE SEAT AND BACK CONSTRUCTION
Filed Oct. 10, 1923    2 Sheets-Sheet 1
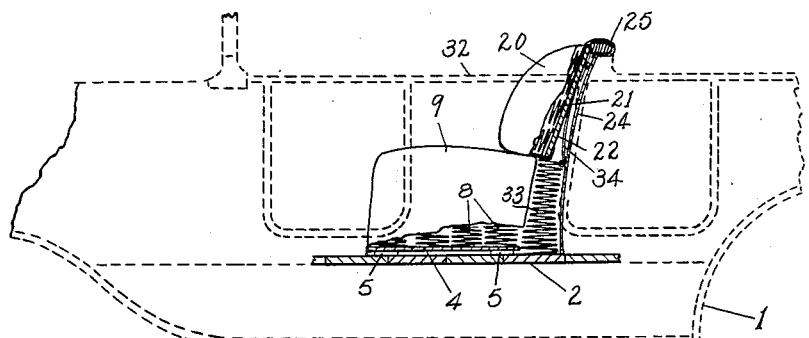
Fig. I.
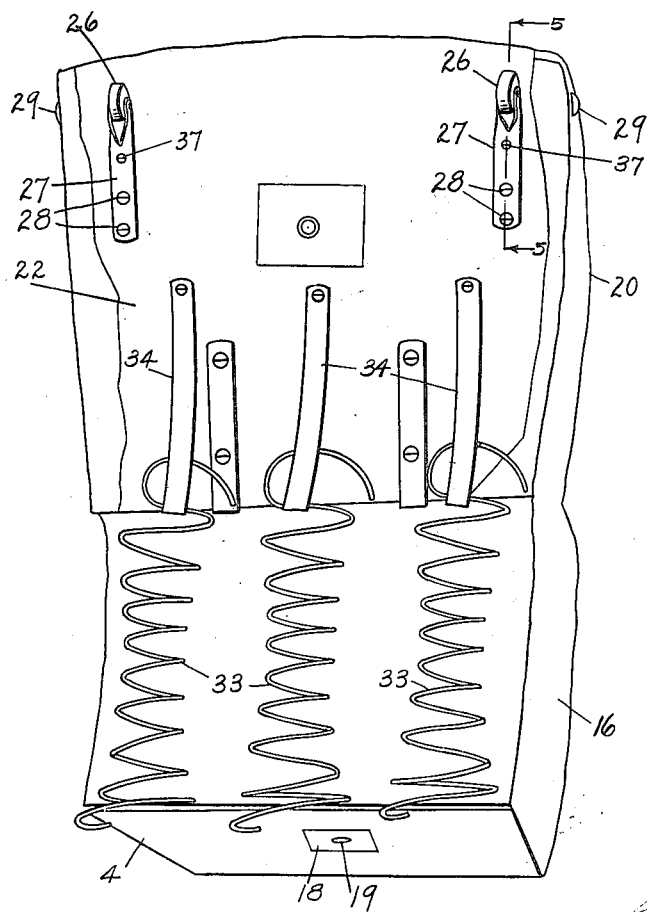
Fig. II.
Inventor
Carl F. Hess Jan. 20, 1925.  1,523,591
C. F. HESS
AUTOMOBILE SEAT AND BACK CONSTRUCTION
Filed Oct. 10, 1923    2 Sheets-Sheet 2
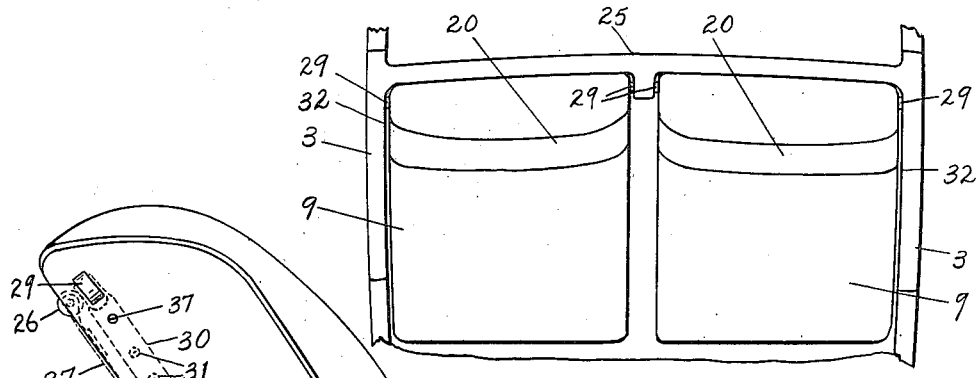
Fig. IV.
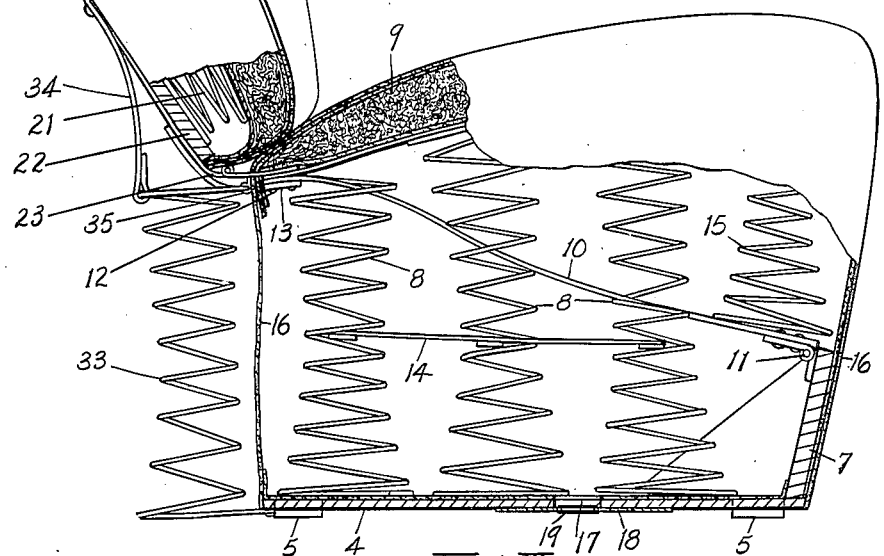
Fig. III.
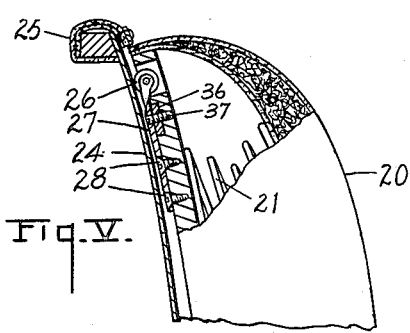
Fig. V.
Inventor
Carl F. Hess
By  
Attorneys Patented Jan. 20, 1925.

1,523,591

UNITED STATES PATENT OFFICE.

CARL F. HESS, OF COMSTOCK PARK, MICHIGAN.

AUTOMOBILE SEAT AND BACK CONSTRUCTION.

Application filed October 10, 1923. Serial No. 667,670.

*To all whom it may concern:*

Be it known that I, CARL F. HESS, a citizen of the United States, residing at Comstock Park, county of Kent, State of Michigan, have invented certain new and useful Improvements in Automobile Seat and Back Constructions, of which the following is a specification.

This invention relates to improvements in automobile seat and back construction, and particularly to improvements which lend themselves to deep seat cushion construction.

The objects of the invention are:

First, to provide an automobile seat and back in which the back cushion is effectively movable up and down with the action of the seat cushion.

Second, to provide improved details of such structure whereby the movement will be free and unobstructed by any undue friction.

Third, to provide improved supports for the seat cushion whereby a deep cushion is effectively supported in its reciprocating position.

Fourth, to provide a deep seat cushion with means for preventing undue rebound.

Further objects relating to details and economies of construction and operation will appear from the detailed description to follow.

I accomplish the objects of my invention by the devices and means described in the following specification. The invention is defined and pointed out in the claims.

A structure which is a preferred embodiment of my invention is illustrated in the accompanying drawings, forming a part of this application, in which:

Fig. I is a side elevation view of one of my improved seat and back structures in position in a Ford automobile body, the body being indicated by dotted lines, portions of the cushions being broken away to show the disposition and arrangement of the springs of the seat and back.

Fig. II is an enlarged detail back view of the seat and connected seat back cushion removed from the automobile, the front portion of the seat cushion being broken away.

Fig. III is an enlarged detail side elevation view in vertical section, portions of the upholstery being broken away to show the relation and connections of the springs and showing the anti-friction side rollers for the back.

Fig. IV is a diagrammatic plan view of a pair of seat cushions disposed in a Ford automobile body, showing the side supports for the cushion back.

Fig. V is a vertical detail sectional view taken on line 5—5 of Fig. II, through the upper part of the back cushion and the back support, showing the anti-friction rollers, the section being taken looking in the direction of the little arrows at the end of the section line.

Considering the numbered parts of the drawing, 1 is an automobile body, 2 is the floor thereof, 3 the top rail at the side of the seat. The seat bottom 4 is supported slightly above the floor on cross cleats 5, and is provided with a heel board 7. The seat cushion is of deep springs 8, 8 with a padded cushion portion 9 at the top. Brace supports 10 are hinged at 11 to the heel board and extend obliquely upward and to the rear, and are riveted at 12 to the supporting cross bar 13 at the rear of the seat cushion pad 9. A brace framework 14 is disposed about midway of the height of the springs 8. The front seat springs 15 are disposed upon the pivoted braces 10.

The entire seat cushion is encased in an upholstery covering 16 which extends around the sides down to the seat bottom board 4 to which it is tightly secured to form a substantially air tight covering. A hole 17 is in the seat bottom 4 covered by a leather valve 18 having a small perforation 19 at the center whereby, when the cushion is collapsed under the weight of the occupant, the air freely escapes and the ingress of air is obstructed when the cushion springs react. This controls the seat cushion and avoids rebound.

The seat back cushion 20 is provided with springs 21 carried on the back board 22 which is secured by hinges 23 to the cross bar 12 at the rear of the seat cushion pad 9, so that it readily hinges thereon and reciprocates up and down with the action of the springs of the seat cushion.

The back board 22 rests against a back support plate 24 which is finished with a padded or cushioned top 25. On the back side of the board 22 are anti-friction rollers 26, carried by brackets 27 secured by screws 28, as seen in Figs. I and V. These travel or reciprocate on the back support plate 24. A plate 36 is attached to the back board 22, and through the plate 36 and bracket 27 is an adjusting screw 37 for adjusting the rollers. Similar anti-friction rollers 29 are carried by brackets 30 secured by screws 31 at the sides of the back cushion (Fig. III). These are embraced by the sides 32 of the back support and keep the back in alignment as it reciprocates up and down following the action of the seat cushion.

To carry this additional load effectively, a row of springs 33 is disposed under the lower edge of the back cushion, being secured thereto by brace 34. The opposite sides of springs 33 are secured at 35 to the rear edge of the bottom cushion pad 9. The lower ends of springs 33 are secured to the back edge of the seat bottom 4 and rest upon the floor of the automobile.

From this description it will be seen that the back cushion and its support are hinged to the rear of the seat pad of the deep spring seat, and that extra spring support is provided, and the back with its cushion is free to reciprocate on a back support, being suitably guided and allowed to run freely by the anti-friction rollers. The lower part is carried by the seat to which it is hinged and does not contact with the back support, and consequently requires no anti-friction device.

I have shown rollers as the anti-friction device, but anything that will permit free movement of the parts will be found to make a very satisfactory structure. I have shown very deep springs, requiring additional support and a diagonal brace. While these features are of importance with very deep springs, they can of course be dispensed with or some equivalent device be made use of with a shallower spring structure. While I have shown a valve for controlling the air, which is very desirable, the seat will be found to be very effective without such a device.

I desire to claim the structure specifically as illustrated and also broadly, as pointed out in the appended claims. Having thus described my invention what I claim as new and desire to secure by Letters Patent is:

1. In an automobile seat and back structure the combination of the seat cushion made up of deep springs, with a heel board at the front, an upholstered cushion pad above the said springs, with a cross bar at the rear edge, oblique supports hinged to the upper edge of the heel board and extending diagonally upwardly and rearwardly to said cross bar, a seat back comprising a back board provided with an upholstered cushion hinged to said cushion pad cross bar at its lower edge and adapted to reciprocate as the seat cushion falls and rises in use, and a back plate support with ways adapted to guide the movement of said back, coacting for the purpose specified.

2. In an automobile seat and back structure the combination of a seat cushion made up of deep springs, an upholstered cushion pad above the said springs with a cross bar at the rear edge, oblique supports connected to said cross bar and extending downwardly and forwardly through the seat structure and connected at the forward end to said cushion frame to maintain the seat upright in action, a seat back provided with an upholstered cushion hinged to said cushion pad cross bar at its lower edge and adapted to reciprocate as the seat cushion falls and rises in use, and a back support with ways adapted to guide the movement of said seat back as specified.

3. In an automobile seat and back structure the combination of a seat cushion made up of deep springs, an upholstered cushion pad above the said springs with a cross bar at the rear edge, oblique supports connected to said cross bar and extending downwardly and forwardly through the seat structure and connected at the forward end to said cushion frame to maintain the seat upright in action, a seat back provided with an upholstered cushion hinged to the back of said cushion pad and adapted to reciprocate as the seat cushion falls and rises, a back support with ways for the said back adapted to the movement thereof, the said seat cushion structure being closely encased in an upholstery cover, and a valved opening opening outward from the said casing for permitting the free discharge of air from the cushion and its gradual admission to avoid rebound, as specified.

4. In an automobile seat and back structure the combination of a seat cushion made up of deep springs, an upholstered cushion pad above the said springs with a cross bar at the rear edge, oblique supports connected to said cross bar and extending downwardly and forwardly through the seat structure and connected at the forward end to said cushion frame to maintain the seat upright in action, a seat back with upholstered cushion hinged to the back of said cushion pad and adapted to reciprocate as the seat cushion falls and rises, a back support with ways for the said back adapted to the movement thereof, vertical auxiliary springs disposed under the said back cushion and connected thereto by suitable braces, as specified.

In witness whereof, I have hereunto set my hand and seal.

CARL F. HESS. [L. S.]